H. T. STOKES.
HYDROAEROPLANE.
APPLICATION FILED AUG. 7, 1913. RENEWED JAN. 6, 1920.

1,378,387. Patented May 17, 1921

Fig. 1.

Witnesses:
INVENTOR
Harlow T. Stokes
By Griffin Bernhard
Att'ys.

H. T. STOKES.
HYDROAEROPLANE.
APPLICATION FILED AUG. 7, 1913. RENEWED JAN. 6, 1920.

1,378,387.

Patented May 17, 1921.
9 SHEETS—SHEET 8.

UNITED STATES PATENT OFFICE.

HARLOW T. STOKES, OF BROOKLYN, NEW YORK.

HYDROAEROPLANE.

1,378,387. Specification of Letters Patent. Patented May 17, 1921.

Application filed August 7, 1913, Serial No. 783,486. Renewed January 6, 1920. Serial No. 349,839.

*To all whom it may concern:*

Be it known that I, HARLOW T. STOKES, a citizen of the United States, residing at the city of New York, borough of Brooklyn, county of Kings, and State of New York, have invented a certain new and useful Hydroaeroplane, of which the following is a specification.

This invention is a hydroaeroplane for navigating the air and to preclude disaster should the machine strike against or alight upon a body of water.

The machine, so far as pertains to the general form of the aeroplane, embodies some of the features of the invention disclosed in a prior Patent No. 1,169,883, granted to me Feb. 1, 1916, wherein there is employed three main planes for sustaining the weight when in flight in the air, two of such planes extending outwardly from a central longitudinal line and the third plane being positioned in spaced relation to and over the two aforesaid planes.

In the present invention the shape and contour of the planes are important features with a view to securing in the planes themselves lateral stability to a certain extent in the craft, as well as to attain the necessary weight carrying capacity with a minimum head resistance to the machine. The main planes are supplemented by auxiliary planes forming wing tips movably connected to the outer ends of the main planes, and will hereinafter be referred to as wing tips. Ailerons are hinged to the rear edges of the main planes, and are used to balance the machine laterally, assisted by the wing tips as will be described. The ailerons and wing tips are connected by cables to a single operating member in such a way that one wing tip at the extremity of one main plane, and one aileron at the rear edge of the opposite main plane are operable simultaneously and in the same direction from said single operating member, a similar arrangement being provided for the remaining wing tip and aileron at the respective sides of the center of the machine, whereby one wing tip and one aileron may be lifted with respect to the two main planes for the purpose of increasing the pressure on the top of the aileron lifted and on the under side of the wing tip lifted at one and the same time. It is to be understood in this respect that lateral balance in my type of machine is controlled in the following manner: Should the machine for any reason while in flight assume an angular position laterally with the horizontal, if not corrected it will side slip also toward the earth, and may overturn or fall. To correct this tendency, the ailerons assisted by the wing tips are brought into use by moving the appropriate knee lever to which a certain aileron and a certain wing tip are connected by appropriate cables. The aileron on the high side of the machine is raised, increasing the pressure on the top side of said aileron for the purpose of pushing downward that side of the machine; by the same movement of the knee lever mentioned the wing tip on the low side of the machine is raised or moved in such a manner as to present a surface opposed to the side slip of the machine, for the purpose of pushing up that side of the machine, so that the combined effect of the two members will bring the machine back to a horizontal or laterally stable position.

The main planes are novel in construction in that they are shaped peculiarly in longitudinal and cross section for the threefold purpose of lateral stability, maximum weight carrying capacity and to minimize head resistance. The two outwardly extending planes, as well as the top main plane, are curved lengthwise and crosswise, and each plane is composed of a series of ribs which vary in size so as to impart a certain important shape to the covering of the plane, all as will hereinafter appear.

The invention is embodied in an aeroplane having a longitudinally extending fuselage, the rear of which terminates in a tail, upon which are mounted a vertical rudder and a plurality of movable tail planes, the latter being operated simultaneously with a forward movable plane positioned at the front of the fuselage, the means for operating the forward and rear movable planes being separate from the operating means for the vertical rudder and independent, also, of the means for controlling the respective pairs of ailerons and wing tips.

The craft is equipped with pontoons for sustaining it on the water and with skids upon which the machine is supported on land, whereby the machine is adapted to comply with the conditions of actual service.

Other features of the invention and the advantages thereof will appear from the following detailed description.

In the drawings,

Fig. 2 is a plan view with a part of one main plane broken away and showing the wing tip and a part of one aileron used in conjunction with said broken away main plane.

Fig. 2ª is a detail view in side elevation illustrating one of the knee levers by which movement is imparted simultaneously to a wing tip on one side of the machine and an aileron on the opposite side of the machine.

Fig. 3 is a front elevation of the craft showing the positions of the pontoons and the wheeled running gear diagrammatically.

Fig. 3ª is a view largely in elevation looking toward the rear of the main planes, the cock pit of the fuselage, the movable wing tips, and the rearwardly positioned ailerons, illustrating diagrammatically the means by which the movement of one knee lever is communicated to a wing tip and an aileron simultaneously and in the same direction.

Fig. 3ᵇ is a diagrammatic view of a part of one of the main planes, said view showing said plane in longitudinal section with the ribs decreasing in height toward the end of the plane or toward the movable wing tips.

Figs. 8, 9 and 10 are cross sections through one of the main planes taken on the lines 8—8, 9—9 and 10—10, respectively, of Fig. 2 for the purpose of illustrating the variation in the size of the ribs at different parts of the plane, whereby the covering of the main plane is given a peculiar curvature longitudinally and transversely of said plane.

Fig. 11 is a detail view illustrating one of the ribs and the means for attaching said ribs to the cross bracing.

Fig. 11ª is a detail view illustrating another embodiment of the composite rib construction.

A hydroaeroplane of the present invention embodies, among other things, a central frame or fuselage A, a plurality of main planes B C extending outwardly from the fuselage, and at the respective sides thereof, a third main plane D positioned over the main planes B C and spaced with respect thereto, landing and supporting skids E depending from the fuselage and positioned for contact with the ground, suitable pontoons F coöperating with the skids, a wheeled running gear G, and a marine brake H, the detail construction of which parts and the functions thereof will now be described.

The frame or fuselage A is skeletonized for securing a light, strong structure, and as shown it is a narrow elongated frame extending forwardly at one end and rearwardly at the other end beyond the main planes. The skeletonized fuselage is composed of longitudinal bars joined by appropriate cross bracing and covered at the sides, top and bottom with canvas, or other material, except at the cockpit $a$, the latter containing a seat $a^2$ for the aviator and being supplied also with devices for operating and controlling the planes and other elemental parts of the craft. Within this fuselage is positioned a motor or engine I, of one form or another, (see dotted lines in Fig. 4) for furnishing the power required to impart motion to the propellers J, two of which are employed for driving the craft. The rear part of the fuselage is inclined at top and bottom and at the sides to result in a tapering tail K, and from the top and bottom inclined surfaces extend the vertical fins $k$, other horizontal fins $k^2$ extending from the respective inclined sides of said tapering tail. At the rear of the tail K and fins $k$ is positioned the usual rudder K' hung by the vertical post k', said rudder being movable by the application of foot pressure to a foot yoke k³ which is connected by cable k⁴ to said rudder, said foot yoke being positioned within the bottom of the cockpit and within convenient reach of the aviator's feet.

Extending upwardly from the front part of the fuselage are standards l which support a front elevating plane L, the latter being pivoted for movement on a horizontal axis. This plane is above the fuselage and forward of the main planes, and to it is connected a cable l', extending over a pulley l⁶ on a horizontal shaft l², the latter being journaled in the fuselage and provided with a sprocket l³ which is engaged by an endless chain l⁴. A horizontal shaft M is mounted on the fuselage, and extends across the cockpit in front of the aviator's station, said shaft being provided with a hand wheel M', and with two sprocket wheels m m', the latter being engaged by the endless chain l⁴. At the rear of the horizontal fins k² at the stern of the fuselage are pivoted other elevating planes N, the latter having struts n to which are connected cables n', the latter leading over guides n² and fastened to a cable n³ which extends around sprockets m on shaft M, whereby the rotation of said shaft in one direction by handwheel M' imparts motion to chain l⁴ and cable n³ so as to simultaneously raise the rear edge of the elevating plane L and to depress the planes N, to send the craft in a downward direction, but a reverse movement of the planes results in sending the craft in an upward direction. The use of this type of control, with a wheel horizontally mounted on a shaft, as shown, results in a safety device of some importance. The wheel and shaft are so connected to the front and rear elevating planes that when rotated toward the aviator, the elevating rudders are so moved as to steer the machine downward, and when rotated away from the aviator, to steer the machine in an upward direction, thus preventing by the very nature of the mechanism and the movements specified a dangerous dive and possible loss of life through the aviator being accidentally thrown forward against the control, and thereby causing a dangerous movement of the elevating rudders, as may happen if a simple lever be used to control said elevating rudders.

Figure 5:
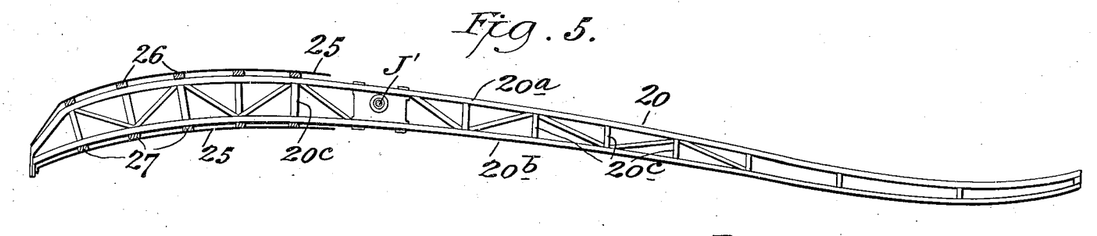
Fig. 5 is a detail view on an enlarged scale illustrating the skeletonized main beam near the front part of one of the two lower main planes.

The main planes B C, shown more particularly in Figs. 1, 2, 3, 5, 8, 9, and 10 are each built up or composed of a front beam 20, (see Fig. 5) a plurality of longitudinal members 21, a series of ribs 22, 23, 24, and a suitable covering 25 preferably of fibrous material, the whole producing a plane having the desirable qualities of maximum weight carrying capacity and lateral stability combined with minimum head resistance, due to the stream line form. The front beam 20 (Fig. 5) tapers from its inner portion next to the fuselage A to the extreme end or tip of the plane; said beam being composed of a top member 20ª, a bottom member 20ᵇ, and intermediate braces 20ᶜ, preferably all of steel tubing of square section suitably welded together as shown. The top and bottom members of said beam are curved longitudinally as shown in Fig. 5 so as to produce a beam the thickness of which is greatest between the fuselage and the shaft bearing for propeller J, said members being curved relatively so as to converge toward and meet at the outer end of the plane. Speaking generally, main beam 20 is curved with a certain radius for about one-third of the distance outwardly from the inner end intermediate its length; from this point the top and bottom members converge in a slightly downward direction, but with a slight reverse curve, the lowest point of said reverse curve being situated about two-thirds of the total length outwardly from the inner end of beam 20; from this point the beam curves slightly in an upward direction to the outer extremity where the curve of the wing tip meets and forms the continuation of the compound curve as viewed from the front of the plane. As situated in the machine, the outer extremity of beam 20 at the front of the junction with the wing tip is about on a horizontal line with the lower end of member 20ᵇ at the front of junction with the fuselage, thus producing in mechanical form the desired natural bird wing shape and curves laterally in the main planes. The curvature of the main beam 20 through the medium of the ribs spaced thereon is such as to impart to the main planes B and C a compound curve on the top and bottom surface lengthwise of said planes.

A rear main beam 21, preferably of round steel tube, is bent with a compound curve similar to a curved line drawn through the center line of the compound curve of main beam 20 as viewed from the front, said curved line being drawn midway between members 20ª and 20ᵇ from inner to outer end of beam 20 and following the general center line of curvature. Beam 21 is positioned in the rear of beam 20 and the ribs, any desired number of which may be used, are fastened crosswise with respect to and fastened to and together by beams 20 and 21 and other longitudinal members, thus producing a substantial and lightweight skeleton structure over which the covering 25 is stretched tightly so as to impart to the plane the desired curvature in longitudinal and transverse section. The ribs vary in length, and in thickness or depth, see Figs. 8, 9 and 10, although in general construction and longitudinal shape the ribs are similar. As shown, each rib (22, 23, 24) consists of a top member 26, a bottom member 27, and a series of cross struts 28 positioned between the members. It is preferred in the construction of the rib to employ wood reinforced or stayed by metallic pieces, see Fig. 11, wherein 26ᶜ represents one of the wooden pieces and 30ᵃ the metal piece attached to the wood so as to stiffen it and so coöperate with it as to result in the wooden filler retaining the shape to which it is bent.

Figures 8, 11A:
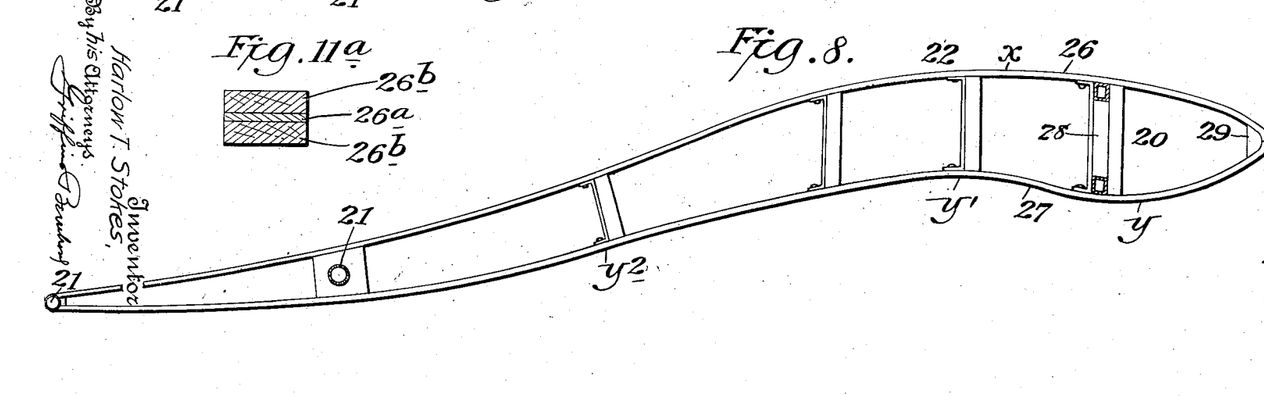

The composite construction of the rib member consisting of the channel iron and the wood filler is advantageous for the further reason that the wood filler provides means for securely embedding the brads or nails used to fasten the fabric covering to the skeleton frame. It is not desired, however, to limit the invention to the use of the channel iron, for the reason that the composite rib may be constructed as shown in Fig. 11ᵃ wherein a length of flat metal 26ᵃ is positioned between lengths 26ᵇ of wood, thus resulting in a laminated rib member of an unbreakable type. It will be noted that the top member 26 of each cross rib is curved lengthwise; thus at the front part of the plane the rib member 26 is arched to produce a top surface $x$ which surface is convex, but rearwardly of this convex surface the rib is concave at $x'$, but such convex and concave curvatures $x$ $x'$ respectively are not so pronounced on that part of the plane toward the end of which is formed by the distant ribs 24.

Figures 9, 10, 11:
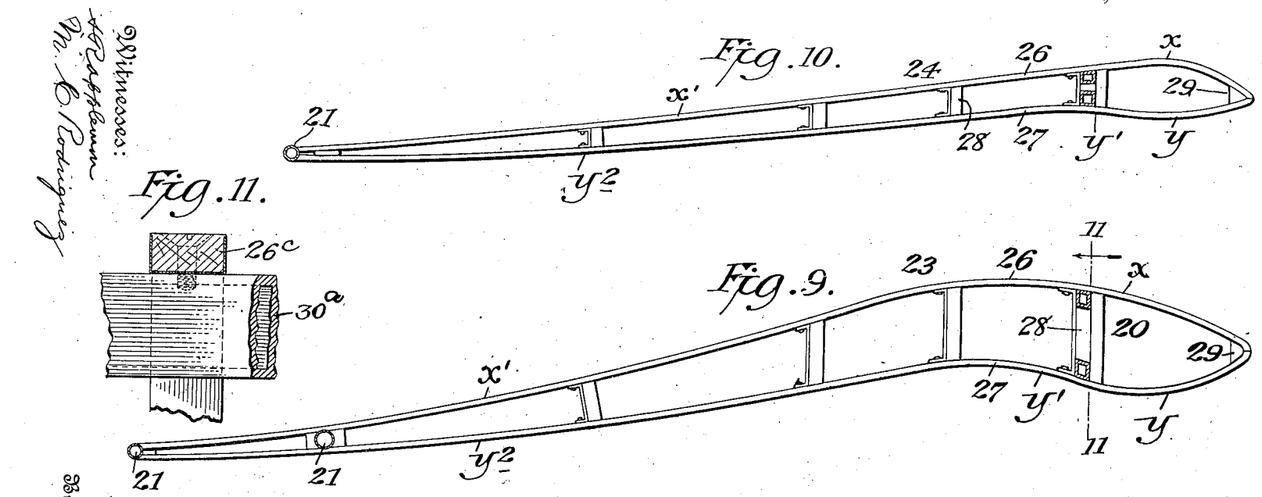

The curvature of the ribs 22, 23, 24, at the rear portions thereof decrease gradually in the successive ribs, i. e., from the ribs 22 at the inner end of the plane toward the ribs 24 at the outer end of said plane, as will be apparent by comparing Figs. 8, 9 and 10. Thus it may be said that the top members 26 of said cross ribs 22, 23, 24, have a compound curvature. In like manner, the bottom member 27 of each cross rib 22, 23, 24, is a compound curve, but the curvature of said bottom member 27 differs from the curvature of the top member as shown in said Figs. 8, 9 and 10. Said bottom, at the forward portion thereof is concave at $y$ and convex at $y'$, and rearwardly of the convex portion $y'$ the bottom member is shaped to produce a slightly concave surface $y^2$, the degree of the curve at $y^2$ being less than that of the curve at $y'$. At the front of the plane, the top and bottom members 26 27 of each rib are joined and reinforced by a stay 29 so as to result in a curved nose at the front of the plane against which the wind or air will be deflected so as to flow over and beneath the plane in a manner to offer but little resistance to the movement of the craft. The employment of ribs progressively decreasing in length from the fuselage toward the outer end of the plane, imparts a tapering form to said plane, viewed in plan; thus the plane is wider at its inner end than at the outer end. By making the ribs of progressively different thicknesses from the inner end toward the outer end, the result is a plane, the thickness of which decreases gradually from the inner end toward the outer end.

It is apparent that the plane is not regular or uniform in contour, but on the contrary, its shape is such as to resemble in the main that of a gull's wing when gliding. Thus, the plane tapers in thickness in both longitudinal and transverse sections, and the curvature varies likewise in both longitudinal and cross section, but the curvature on the under surface of the plane is such as to result in the air flowing beneath such curved under surface in a manner to impart the desired weight carrying or lifting capacity and to secure increased lateral stability to the craft. While the ribs are built up and shaped with a substantially similar shape, it will be noted that the ribs at the point of junction with beam 20, or in other words just in the rear of the nose of each rib, are so constructed as to be very wide, so as to gain considerable depth or thickness to the plane at this point. For this reason, and because of the compound curvatures rearwardly, the plane as a whole conforms to the stream line or flow of air, thus producing a high efficiency in lift and balance as well as a minimum head resistance.

In the type of plane under consideration an important advantage is secured, i. e., a dynamic propulsive effect of the air upon the surfaces of the plane due to the compression of the air at the rear of the cross sectionally deep point of the plane. It is to be noted that when the craft is in flight, the air is divided by the nose of the plane, flowing with a stream-like effect into contact with the top and bottom surfaces of said plane. Now, when the air flows beyond the deep front part of the plane, the air flows into contact with the top and bottom surfaces and acts under compression thereon, the effect of which is to exert a dynamic propulsive force on the balance in a forward direction.

It is apparent that the top surface of the plane, viewed from the top in plan, near the front part is continuously convex at $x$ over the high parts of the ribs, but the curves decrease from the inner ribs toward the outer ribs which are shorter and of less depth than the inner ribs. Rearwardly of this convex surface at the high parts of said ribs, the top surface is concave at $x'$ toward the rear edge of the plane, the degree of curvature decreasing over the low parts of the ribs and decreasing also toward the short outer ribs, whereby the top surface of the plane offers as little resistance as possible to the passage of the air because of the stream line form.

In the plane of this invention, the rib at the inner end, or that end adjacent the fuselage, is positioned at the greatest angle with reference to the horizontal, and from this inner rib the successive ribs toward the outer end of the plane decrease with respect to the angle of incidence and, also, with reference to the length of the individual ribs and to the depth or thickness of the successive ribs, thus resulting in a plane the width of which decreases from the inner end toward the outer end and the thickness of which decreases also from the inner end toward the outer end and decreases also from the front relatively blunt edge toward the rear comparatively thin edge. From the rib of greatest angle, (positioned as described at the inner end of the plane) the rear edge of said plane forms a curve similar in general principles as shown in a center line following the compound curve of main beam 20 with the difference that the radius of the curve of the inner third of the rear edge of each main plane is less than the radius of the front curve, thereby appreciably lowering the rear inner corner of each main plane, resulting in increased weight carrying capacity for the respective planes, lateral stability also being helped to a marked degree. The combination of all of the curves and shapes mentioned herein are the advanced development of the mechanical development of a natural bird's wing as outlined in my prior Patent No. 1,169,883, to which reference has been made, and continued herein, and is termed by me a bird wing type of plane, the object sought being a type of plane of given maximum weight carrying capacity by reason of its air confining shape longitudinally, least head resistance by reason of its stream line form, and stability laterally by reason of the compound curves of each rib on the upper and lower sides thereof, consisting on the under side of each rib of a part of a parabola merging into a reverse curve rearwardly. The said curves are situated on each rib, and each rib is situated in each plane, so that the center of pressure at any given angle of the whole plane is situated at a different place on the under side of each rib, not in a straight line at right angles to the fuselage and parallel to the front edge of the plane, but combined in all of the ribs the center of pressure is spaced over a considerable area of the plane fore and aft thereof.

The third plane D occupies a position above the main planes B and C and fuselage A, said plane being connected in a substantial manner to the fuselage and the planes by struts $d$. Said plane D is composed of a series of ribs covered by a suitable fabric, the ribs being constructed of wood and metal, as heretofore described, and said ribs being arranged for the highest ribs to occupy the middle position. The ribs decrease in height from the middle ribs toward the end ribs, and each rib tapers from the middle toward the front and rear edges of the plane. The thickest ribs are positioned at the middle part of plane D, the ribs at the respective sides of said middle rib progressively decreasing in thickness toward the respective ends of said plane. Each rib tapers in thickness from the front portion to rear portion thereof. Furthermore, the angle of incidence for the respective end ribs is less than the angle of incidence for the middle rib. The end portions of the plane D are spaced relative to the two lower planes, as shown; said end portions of plane D are curved upwardly at $d'$, and these upwardly curved portions $d'$ are flexible more or less so as to yield under the effect of side wind pressure. The top surface of plane D is generally convex and the bottom generally concave, to confine the air to a certain extent, and is designed on the same principles that govern the ribs in the main planes. By spacing the ends $d'$ relative to the planes B C, and curving said ends upwardly, the air is permitted to escape freely beneath the plane at the ends thereof. The flexible tips $d'$ of plane D are curved reversely to the top and bottom surfaces of the plane to secure the free outflow of air from beneath the plane, and to add to the natural stability of the plane as a whole.

Figure 1:
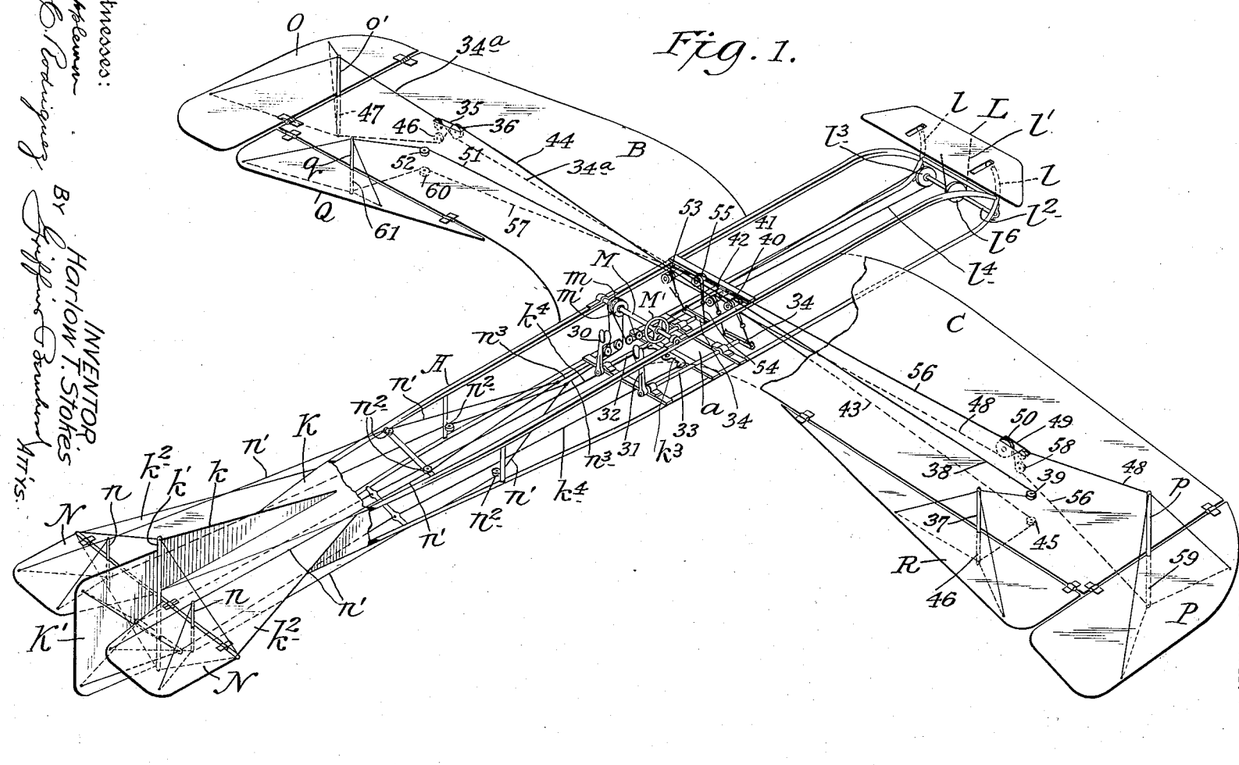
Figure 1 is a perspective view of a hydroaeroplane illustrating certain parts of the present invention.
Figures 2, 2A:
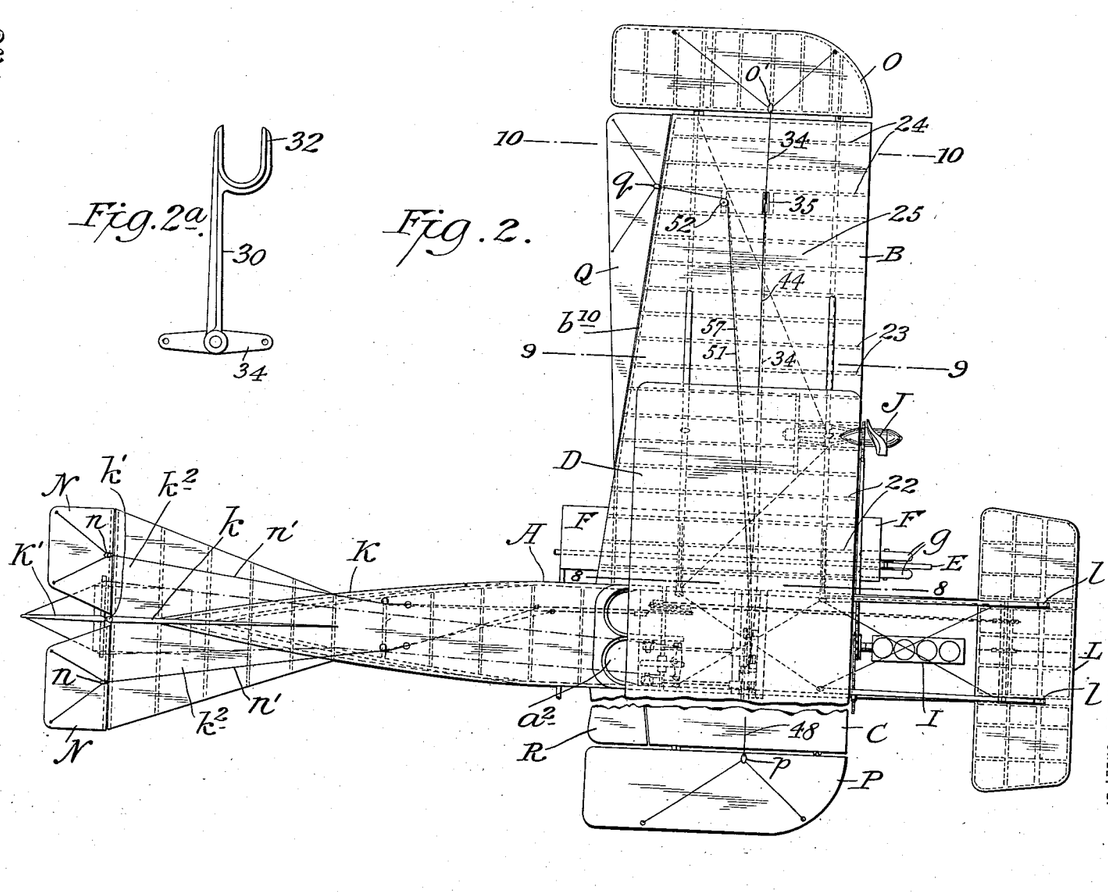
Figures 3, 3A, 3B:
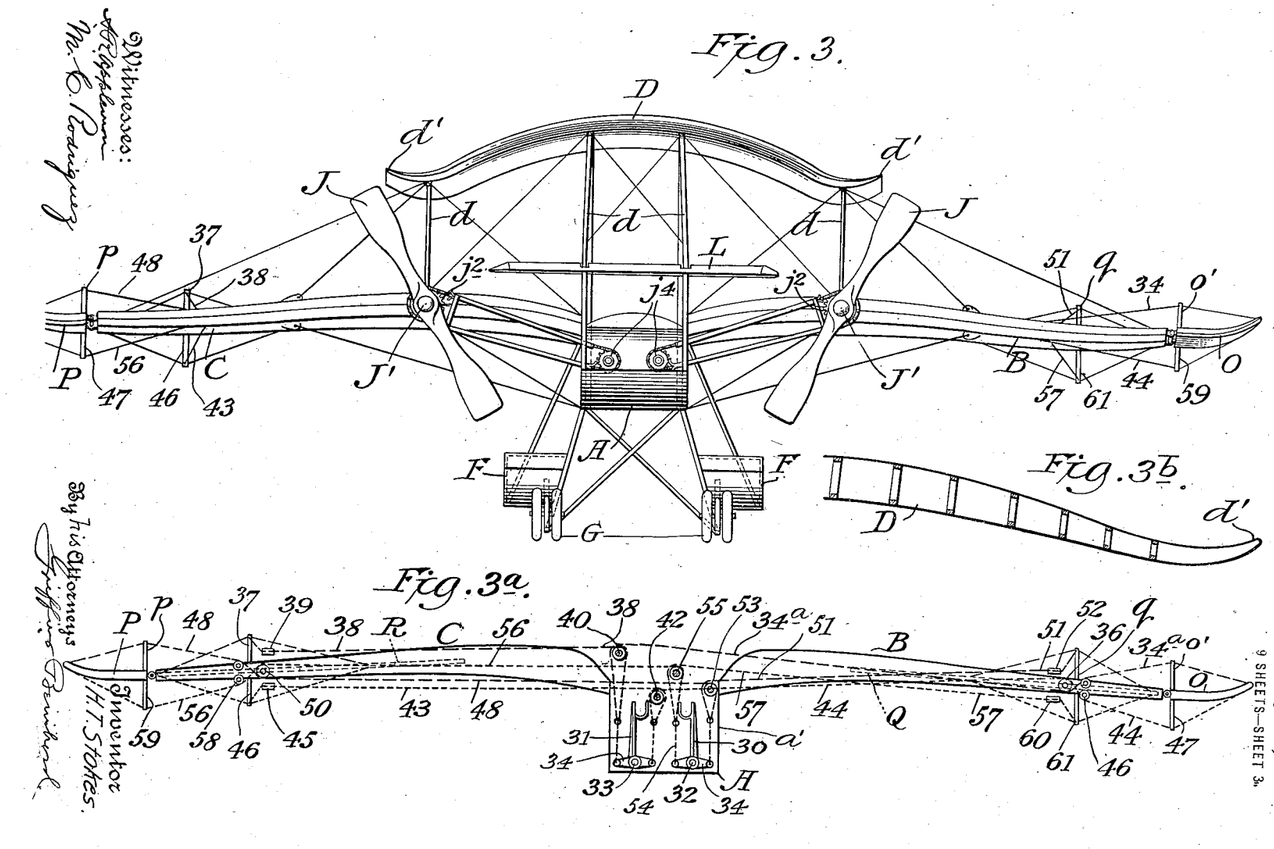

Coöperating with the main planes B C are the wing tips O P and ailerons Q R. The wing tips are positioned at the outer ends of said main planes, to which they are hingedly connected for movement on horizontal axes, said wing tips constituting flexible ends for the main planes. Each wing tip is shown in Figs. 1 and 2 as an approximately rectangular plane with a front corner rounded as at $o$, said wing tip being curved upwardly in cross section as shown in Fig. 3, the curve extending outwardly from the hinge toward the free end and producing a substantially concave top surface and a substantially convex bottom surface. It is to be understood that the portion of the wing tip at the point of junction to the main planes B and C is shaped substantially the same as the last or outermost rib of said main plane, with a compound curve fore and aft, at the same time curving outwardly substantially as specified.

In the form of machine shown more particularly in Figs. 1 and 2, each main plane B C is positioned relative to the fuselage so that the straight front edge of the plane is at an angle to the longitudinal axis of said fuselage. By constructing each plane with a series of ribs which decrease in length from the fuselage toward the outer end of the plane, there results a plane the rear edge $b^{10}$ of which is inclined to the fuselage as shown in Fig. 2, said plane decreasing in width from the end nearest the fuselage to the end distant from the fuselage. The ailerons Q R are triangular in shape, and are positioned next to the inclined rear edges $b^{10}$ of said main planes B C. The ailerons thus increase in width from the inner end thereof toward the outer narrow ends of planes B C, and each aileron is hinged to the rear edge of one main plane for movement on a horizontal axis, the axis of movement of aileron Q being substantially at a right angle to the axis of movement of the adjacent wing tip O, a similar arrangement being employed for the axes of movement of the adjacent wing tip P and aileron R. It is to be noted that wing tip O and aileron Q are in coöperative relation to weight carrying plane B and are positioned at one side of the longitudinal central line of the craft, whereas the other wing tip P and aileron R are in similar relation to the other weight carrying plane C and lie on the opposite side of the longitudinal central line of the craft.

A salient feature of the invention consists in a cross connection between one aileron and one wing tip with a single operating device in such manner that a movement of the operating device in one direction will impart simultaneous movement to the connected aileron and wing tip at opposite sides of the craft, for the purpose of moving the aileron and wing tip in the same direction and simultaneously. Thus, the wing tip P and aileron Q at opposite sides of the craft, i. e., the wing tip P on plane C and aileron Q on plane B, are connected with a single operating device, preferably embodied in the form of a knee lever 30, whereas the other wing tip O and aileron R at opposite sides of the fuselage are connected with another operating device, such as the knee lever 31. As shown, the knee levers 30 31 are positioned within the cock-pit so as to occupy a position within convenient reach of the aviator occupying the seat $a'$, so that the legs of the aviator will fit in suitable crotches 32 provided in the upper ends of said knee levers, whereby the aviator is able to work the knee levers by his legs and to operate the steering yoke $k^3$ by the feet, the hand wheel M' being directly in front of the aviator so as to be within convenient reach. The knee levers 30 31 are supported on rock shafts 32 33 suitably mounted in bearings in the bottom part of the cockpit, and said rockshafts are provided at their other ends with lever arms 34 to which are attached the cables employed for operating the pairs of ailerons and wing tips.

Extending upwardly from wing tips O is a strut $o'$ to which is attached a cable $34^a$ extending through a slot 35 beneath a guide pulley 36 provided within the plane B. The aileron R is provided with an upwardly extending strut 37 to which is attached a cable 38 extending around a guide 39 of plane C. The cables $34^a$ 38 extend toward each other so as to run over a pulley 40 supported in the fuselage, said cables $34^a$ 38 being connected below the pulley 40 and are attached to one end of lever 34 on the rockshaft of knee lever 31, whereby a movement of knee lever 31 to the left in Fig. $3^a$ will operate lever arm 34 so as to pull on cables $34^a$ 38 simultaneously for the purpose of swinging wing tip O and aileron R in an upward direction at the same time. From the other end of lever arm 34 on the rockshaft of knee lever 31 extends a cable 41, the same being branched at 43, 44, said branch cables passing over a sheave 42, the branch cable 43 extending around a pulley 45 and connected to a depending arm 46 of aileron R, whereas the branch 44 extends beneath a guide pulley $46^a$ and is attached to a depending arm 47 of wing tip O, whereby the movement of knee lever 31 in a direction to exert pull on the cables $34^a$ 38 to elevate wing tip O and aileron R at the same time will slacken cables 41 43 44 so as to permit the arms 46 47 on the parts O R, respectively, to swing in a direction enabling wing tip O and aileron R to be moved upward simultaneously with the slack established in the cables 43 44. Obviously, the movement of knee lever 31 in an opposite direction will cause the lever arm 34 to pull on cables 43 44 for the purpose of moving wing tip O and aileron R simultaneously in a downward direction, at which time the cables $34^a$ 38 are slackened to secure such downward movement of the parts O R.

The other knee lever 30 is connected in a similar way with the wing tip P and aileron Q. Said wing tip P is provided with an upwardly extending arm $p$ to the upper end of which is attached a cable 48, the latter passing through a slot 49 provided in plane C and beneath a pulley 50 mounted within said slot, said cable 48 extending lengthwise of the plane C and within it. Aileron Q is shown as having an upwardly extending arm $q$ to which is attached a cable 51 passing around a guide pulley 52, said cables 48 51 extending toward each other so as to pass over a guide pulley 53 provided in the fuselage, said cables being connected below pulley 53 and being attached to a lever arm 34 on the rockshaft of knee lever 30. Now when the knee lever 30 is moved to the right of Fig. $3^a$, the lever arm 34 will pull on the connected cables 48 51 for the purpose of exerting pull on wing tip P and aileron Q for moving them upwardly at the same time. It will be observed that the connected cables 48 51 are attached to one end of the lever arm 34 on the rockshaft of knee lever 30, but from the other end of this lever arm 34 extends a cable 54 which is attached to branch cables 56, 57, the latter passing upwardly and over a guide sheave 55. Cable 56 extends over the top of plane C and passes over sheave 50 through slot 49 and beneath the sheave 58 provided on the inside of plane C, said cable 56 being attached to a depending strut 59 on wing tip P. The other cable 57 passes within plane B to and around a guide sheave 60 and is attached to a depending arm 61 provided on aileron Q.

It is apparent that the movement of knee lever 30 toward the right in Fig. 3$^a$ will pull on cables 48 and 51 for the purpose of elevating wing tip P and aileron Q simultaneously, at which time the lever arm 34 of knee lever 30 will slacken the pull on cables 56 57 so as to permit said upward movement of the parts P Q; but when the knee lever 30 is moved toward the left, then the lever arm 34 associated therewith will slacken cables 48 51 and pull on cables 56 57 so as to pull the parts P Q downwardly at the same time.

The ailerons and wing tips are thus connected in pairs for simultaneous operation, for the purpose of restoring the craft to a condition of equilibrium. When the craft is in flight and dips to one side, the operator shifts the knee lever for the purpose of raising the aileron on the high side and the wing tip on the low side, the effect of which is to simultaneously raise the two mentioned parts so as to increase the pressure on the high side of the aileron and bring the craft back to a substantially normal position, it being evident that the ailerons and wing tips are under the immediate control of the aviator.

Figures 6, 7:
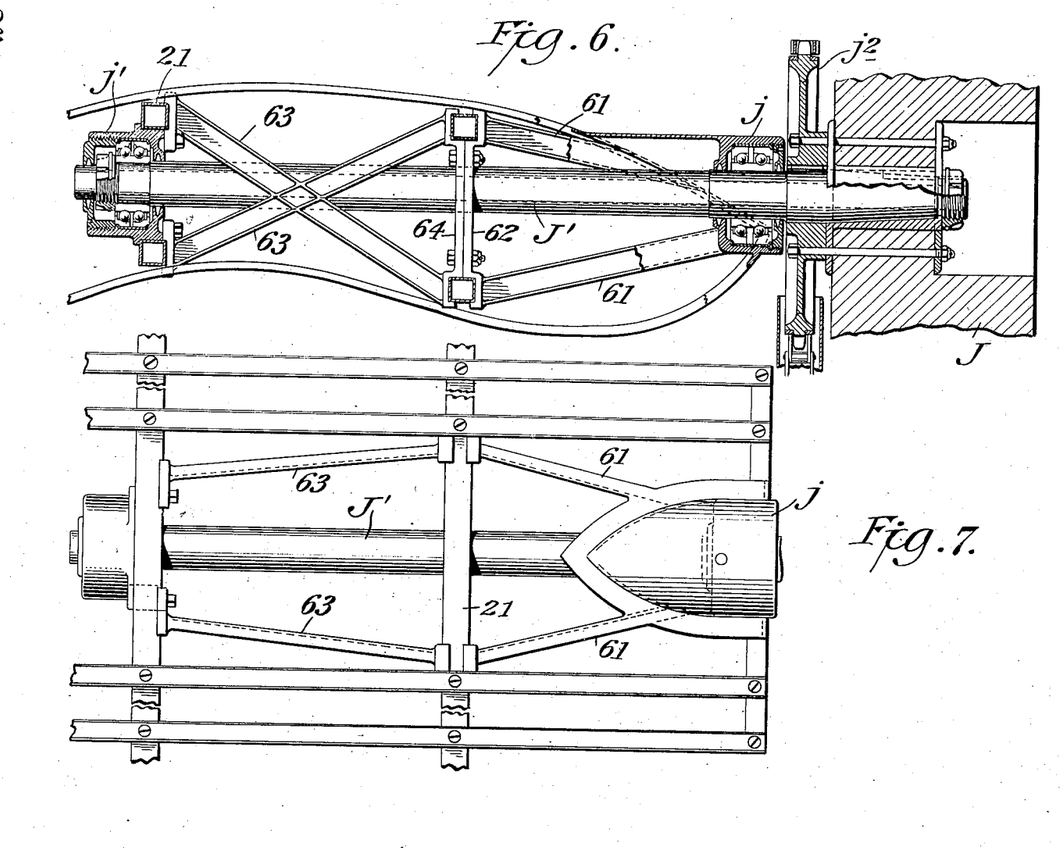
Fig. 6 is an enlarged vertical section through a part of one of the main planes illustrating more particularly the bearings for the propeller shaft and a part of the propeller hub.
Fig. 7 is a plan view of the parts shown in Fig. 6.

The propellers J are carried by shafts J', and said shafts are supported by bearings $j$ $j'$ in the main planes B C intermediate the ends of said planes. The hubs of the propellers are fastened suitably to end portions of the propeller shafts, and on these propeller shafts are secured sprockets or gears $j^2$ adapted to be engaged by a sprocket chain $j^3$ to which motion is imparted by sprocket wheels $j^4$ driven by the engine I, although it is evident that other forms of gearing may be employed. The propeller shafts extend from the front edges of planes B C inwardly of said planes and within them, and one bearing $j$ for the propeller shaft is positioned at the front edge or nose of each plane, whereas the other bearing $j'$ for each propeller shaft is positioned within one of said planes, as shown in Figs. 6 and 7. Any suitable form of shaft bearing may be employed, although in Fig. 6 I have shown a special form, including ball bearings to minimize the friction and wear on the shaft. The shaft bearings are secured firmly to suitable members of the skeleton frame to which the fabric material of the planes is attached; as shown in Figs. 6 and 7, the front shaft bearing $j$ is provided with diverging arms 61 which are integral with cross brace 62. The rear shaft bearing $j'$ is provided with crossing arms 63 which extend forward to a cross brace 64, and the two cross braces 62 64 are bolted together and to the longitudinal beam 21 of the main plane, whereby the shaft bearings of the propeller shaft are secured firmly in position on the respective planes, said shaft bearings being so stayed and braced as to minimize vibration.

Figure 12:
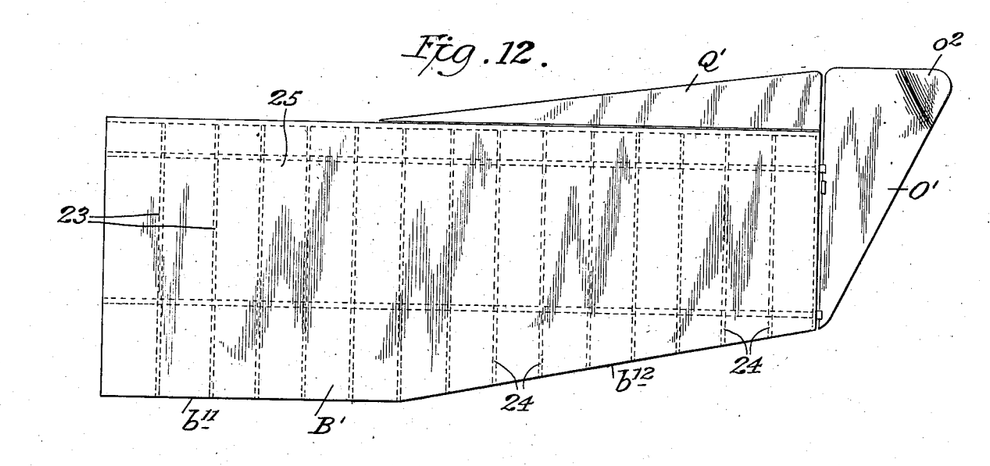
Figs. 12 and 13 are views in plan and front elevation, respectively, of another form of the main plane, and the aileron and wing tip used in connection therewith, illustrating a further development of the invention.
Figure 13:
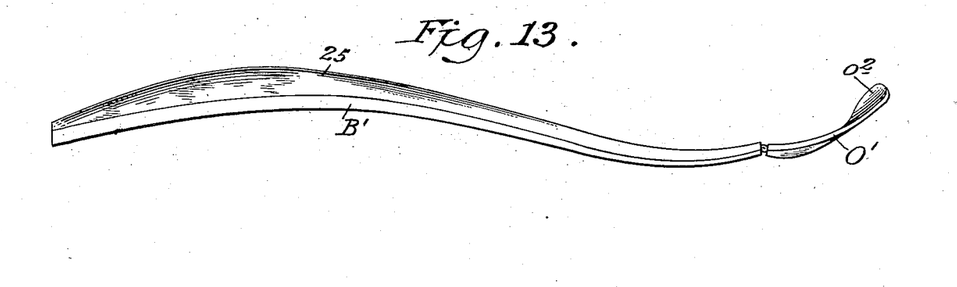
Figure 14:
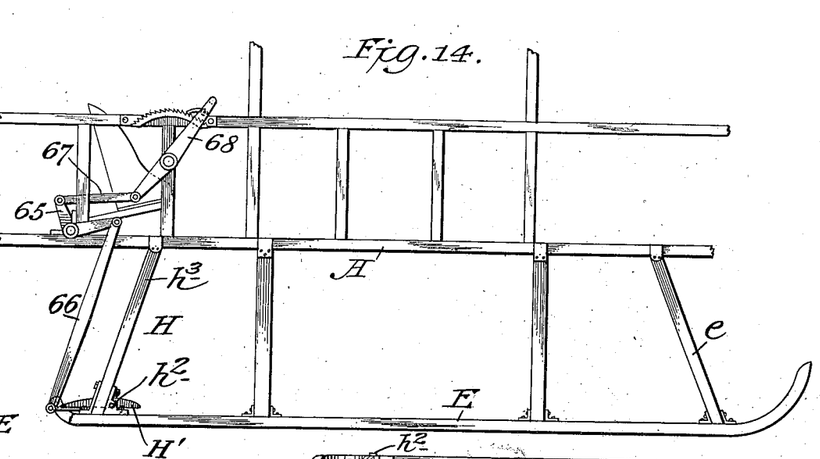
Fig. 14 is a side elevation of a part of the craft illustrating the skids and one embodiment of the marine brake.
Figure 15:
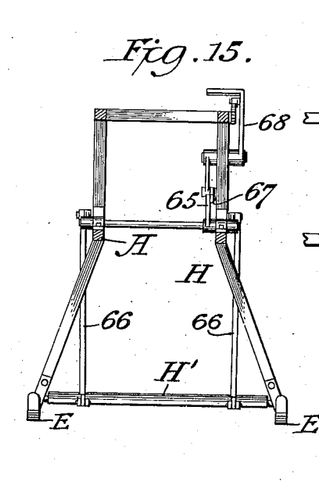
Fig. 15 is a front view of the parts shown in Fig. 14.
Figure 16:
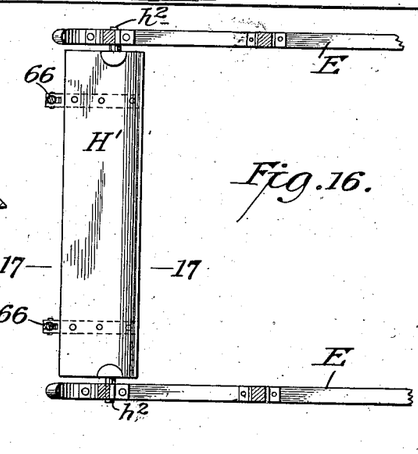
Fig. 16 is a plan view of the marine brake in conjunction with the skids.
Figure 17:
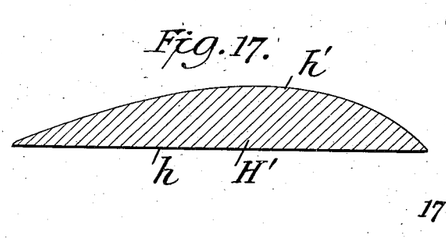
Fig. 17 is an end view of a preferred form of the brake shoe.

Although I have shown a particular form of main plane, and a particular form of aileron associated therewith, it is not desired to limit the invention to the shape of the main plane and the particular form of the wing tip, for the reason that the main plane and wing tip may be of the form shown in Figs. 12 and 13 of the drawings. Plane B' is provided with a straight rear edge instead of the inclined rear edge $b^{10}$, whereas the front edge of said plane B' is straight at $b^{11}$ and inclined at $b^{12}$, the rear edge of the plane and the straight front edge $b^{11}$ being parallel, whereas the edge $b^{12}$ inclines or recedes from the straight edge $b^{11}$ rearwardly toward the outer end of plane B'. A triangular aileron Q' is positioned at the rear straight edge of main plane B' and at the outer end of planes B' Q' is a triangular wing tip O', the length of which is equal to the aggregate width of planes B' Q'. This wing tip O' is substantially triangular when viewed in plan, the outer rear corner of said aileron being curved upwardly at $o$. The wing tip O' extends across the outer end edges of planes B' Q' so as to overlap them, and this wing tip is hinged to said outer end of plane B' for movement on a horizontal axis. The wing tip O' should be connected with an aileron at the rear of the other main plane. Obviously, each weight carrying plane B C may be constructed as shown in Figs. 12 and 13, and each main plane may be provided with a triangular wing tip, such as O', and a triangular aileron, such as Q'. By employing a main plane with the inclined front edge $b^{12}$, and with a triangular wing tip O', the weight carrying plane is made to substantially resemble the edge contour of a bird's wing when gliding, but in my invention the wing tip is a separate movable member which is controllable at will by a simple lever, or equivalent mechanism. The curved wing tips by reason of the curved shape imparted thereto, allows the air to escape around the end, the upturned curved shape of the wing facilitating the escape of the air and adding to the natural stability of the plane.

Figure 4:
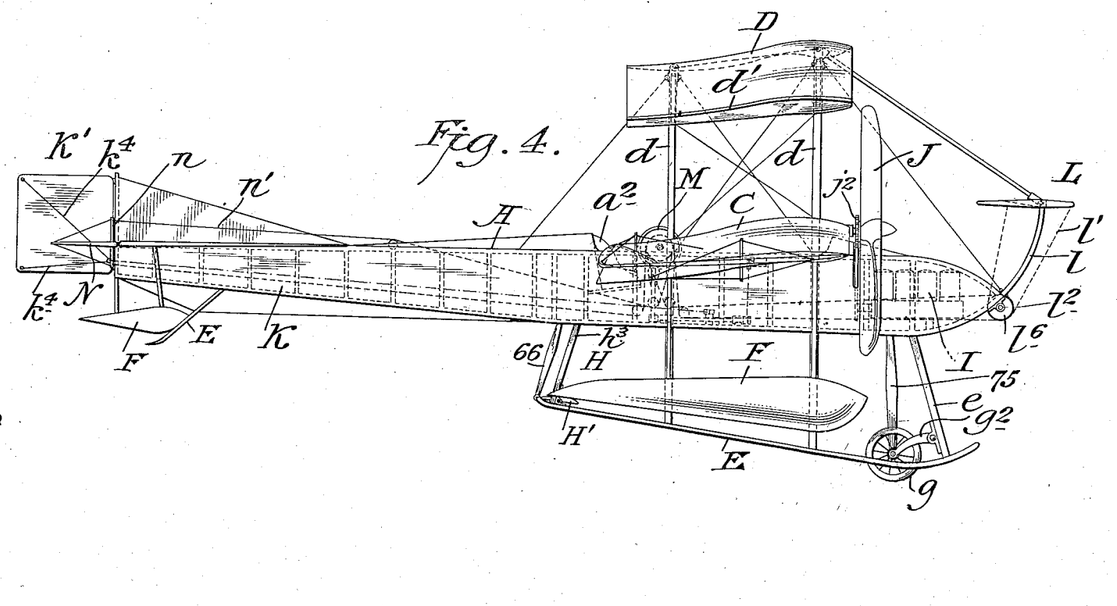
Fig. 4 is a view in side elevation looking toward the right of Figs. 1 and 2.

As shown in Fig. 4, landing skids E are provided at the front and rear parts of the hydroaeroplane, and with these skids are associated pontoons F, the latter extending in the general longitudinal direction of the craft. The pontoons are preferably of the form shown, being rounded at their forward ends and tapering toward the rear. As shown, the pontoons are attached to the struts $e$ by which the skids are connected to the fuselage, but, obviously, the pontoons may be rigidly connected with the machine by other means. In Figs. 4, and 14 to 17, inclusive, I have represented another feature of the invention, the same consisting of a marine brake adapted to fulfil a two-fold function, first, as a means for retarding the motion of the craft when it alights upon the water, and moves rapidly over the surface thereof, and second, as a means for breaking the suction when starting the craft from the water level.

One element of the brake is a shoe H′ extending between the adjacent skids E, and pivoted at $h^2$ to a pair of said skids. This brake shoe is provided with a flat under face $h$ and a curved top face $h'$, or may be of some other suitable form, curved for instance, and said shoe is pivoted intermediate its front and rear edges by means of pins $h^2$ supported in suitable bearings of the skids E, whereby the brake shoe is pivotally mounted upon the skids for swinging movement thereon, or may be fastened to skids through the medium of links to give greater movement to said brake shoe. If desired, the brake shoe may be connected by links with the fuselage. Suitable means are provided for moving the brake shoe to different operative positions, and in Fig. 14 the operating means is shown as a bellcrank 65 fulcrumed on the fuselage. One arm of the bellcrank is connected by a link 66 with the heel of the brake shoe, and to the other arm of the bellcrank is pivoted a link 67 connected to an operating lever 68 fulcrumed on the fuselage A within convenient reach of the aviator. Suitable means are provided for locking the bellcrank and brake shoe in their adjusted positions, such as a pawl adapted for engagement with a ratchet.

When the aeroplane descends upon the water the pontoons F support the weight of the machine so that it will float. As the machine glides toward the water and strikes upon the surface thereof, the operator should manipulate lever 68 and turn the brake shoe H′ through an arc of 90° more or less, thereby presenting the under or flat surface $h$ of said brake shoe to the water. Now, as the craft moves forward, the position of the brake shoe tends to retard the motion of the craft, and eventually bring said craft to a stop, for the reason that the water acts against the large flat area of the brake shoe. Another, and no less important, function of the brake shoe is that upon starting the hydroaeroplane over and upon the water, said brake shoe may be set at an angle to the surface of the water, and owing to the fact that said shoe is now immersed in the water, it acts as a hydroplane and as the machine gains speed, said shoe will aid to lift the machine out of, and free from, contact with the water owing to the fact that the water acts against the under side of the shoe which becomes in effect a hydroplane, when it is set at a certain angle to the line of progress of the aeroplane. The brake shoe thus coöperates with the pontoons in lifting the hydroaeroplane from the water as the machine is driven forward. Obviously, the brake shoe should normally occupy a position wherein its under surface is substantially horizontal in order to offer least resistance to the wind during the flight of the craft as an aeroplane.

Figures 18, 20:
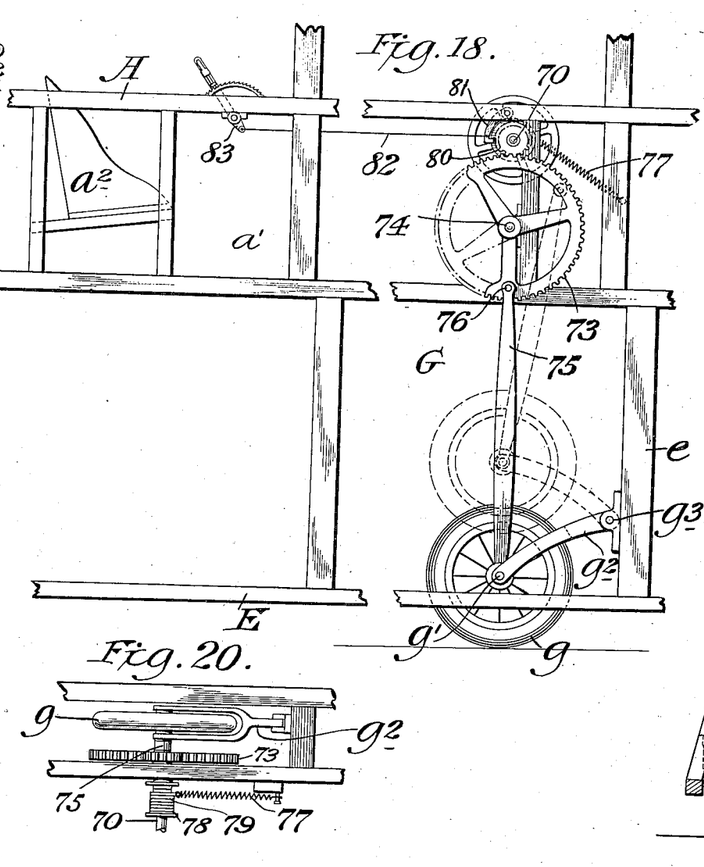
Figs. 18 and 19 are views in side and front elevation illustrating the running gear and the operating means therefor employed for supporting the craft when beginning flight.
Fig. 20 is a detail plan view illustrating the spring controlled winding spool associated with the running gear for the purpose of automatically elevating said running gear and retaining the same in said raised position.
Figure 19:
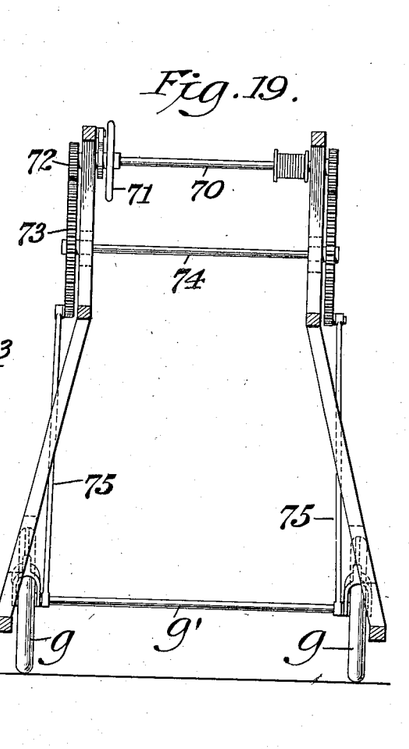

In Figs. 18 and 19 of the drawings, there is shown a wheeled running gear and operating means therefor, whereby the machine may be raised off the landing skids preliminary to starting the flight from the ground. The running gear consists of wheels $g$ mounted on an axle $g'$ which is connected by forks $g^2$ to certain struts $e$ of the landing skids. The forks $g^2$ are connected loosely to the axle $g'$, and they are pivoted at $q^3$ to the struts $e$. Within fuselage A is mounted a shaft 70, the latter being provided with a hand wheel 71 adapted to be operated by the aviator for the purpose of lowering the wheels $g$ into contact with the ground in such way as to lift the forward part of the machine and result in said machine being supported by the ground wheels $g$ and the rear skid. The shaft 70 is provided at its end portions with pinions 72, the teeth on which mesh directly with the teeth of gear sectors 73, the latter being supported on a horizontal shaft 74 supported in the fuselage below hand wheel 71. The gear sectors 73 are adapted to be turned by the motion of shaft 70 transmitted through the pinions 72, and to these sectors 73 are pivoted links 75 by means of pins 76, said links 75 extending downwardly from the sectors 73 and connected loosely with the axle $g'$ of ground wheels $g$. The ground wheels are normally raised above the skids to the dotted line position of Fig. 18 by the action of a spring 77 and a drum 78. Said drum is secured rigidly to shaft 70, and around the drum is coiled a cable 79, one end of which is fastened to drum 78 and the other end is connected to spring 77. The shaft 70 is provided, also, with a ratchet 80 normally engaged by a pawl 81 to which is connected a cord or rod 82 leading to a hand lever 83 positioned within convenient reach of the aviator's seat $a'$ in the chassis A.

Assuming that the machine rests on the skids E in contact with the ground, and that it is desired to start the flight, hand wheel 71 is rotated so as to turn shaft 70 and pinions 72. These pinions impart motion to the sectors 73 which operate to lower the links 75 and pivoted arms $g^2$ until the ground wheels $g$ rest upon the ground. By continued movement of the hand wheel, the links 75 will act on the ground wheels so as to bring the pivot 76 eventually into line with the shaft 74 and axle $g'$, thus constituting in effect a toggle joint by which power may be applied to lift the machine with a minimum effort on the part of the aviator. The described mechanism enables the machine to be raised so that its weight rests upon the rear skid and the ground wheels, and the machine in this condition will run easily over the ground so as to start the flight of the craft. Now when the machine is in the air, it is desired to lift the running gear to a normal position above the skids in order that the running gear and its consequent weight be raised to a position nearer the line of center of thrust of the machine. The operation of shaft 70 by hand wheel 71 to lower the wheels into contact with the ground has the effect of turning drum 78 so as to coil its cable 79 thereon and increase the tension of spring 77, and at this time the pawl slips idly over the ratchet so as to permit the winding of the cord upon the drum, the spring being under tension. The craft being in flight through the air it is only necessary for the operator to turn lever 83 for the purpose of disengaging the pawl from the ratchet, whereupon the tension of the spring 77 unwinds the cable 79 from drum 78, and the shaft 70 is thus turned in an opposite direction for the purpose of reversing the gear sector 73 and lifting arms $g^2$ and ground wheels $g$ to the dotted line position of Fig. 18. Obviously, the elevation of the ground wheels is performed automatically by the spring when the pawl is disengaged from the ratchet.

While I have shown and described a hydroaeroplane wherein three main planes B C and D are used it is evident that the plane D may in some instances be omitted. As a result the aerocraft will be constructed with main planes B C of the bird wing type, said aerocraft being of the monoplane type and embodying the salient features of the invention as herein disclosed.

Having thus fully described the invention, what I claim as new, and desire to secure by Letters Patent is:—

1. In a machine of the class described, a plurality of three weight carrying planes one of which is positioned above and in spaced relation to the other two planes, said upper plane being composed of a series of ribs the thickest of which is at the middle part of the plane and the ribs at the respective sides of the middle rib progressively decreasing in thickness toward the respective ends of the plane, the angle of incidence being less for the respective end ribs than for the middle rib.

2. In a machine of the class described, a weight carrying plane of the bird wing type characterized by a compound curvature in the direction of the length and width thereof, said plane embodying a longitudinally tapering main beam and a series of cross ribs attached to said tapering main beam, the ribs of said series decreasing in length from the inner end of the plane toward the outer end thereof and the angle of incidence of the rib at the inner end of the plane being greater than the angle of incidence of the rib or the outer end of the plane.

3. In a machine of the class described, a weight carrying plane of the bird wing type, characterized by a compound curvature lengthwise and crosswise thereof and embodying a main longitudinal beam curved in the direction of its length, and a series of cross ribs attached to said beam, said cross ribs decreasing in height and length from the rib at the inner end of the plane to the rib at the outer end of the plane, the angle of incidence of the rib at the inner end of the plane being greater than the corresponding angle of the rib at the outer end of the plane.

4. In a machine of the class described, a weight carrying plane comprising longitudinal members, transverse members, and a casing therefor, certain of said members each being composed of channeled metal and a wooden filler occupying the channeled metal, said wooden filler being coextensive to the channeled metal.

5. In an aerocraft, a plane of the bird wing type embodying transverse ribs each curved longitudinally and inclined downwardly toward the rear of said plane, said ribs decreasing in depth from the inner end of the plane toward the outer end thereof, the angle of incidence of the successive ribs decreasing from the rib at the inner end of the plane toward the rib at the outer end of said plane.

6. In an aerocraft, a plane of the bird wing type embodying curved ribs positioned transversely with respect to said plane, each rib being tapered longitudinally and said ribs decreasing in height from the inner end of the plane toward the outer end thereof, the angle of incidence of the successive ribs decreasing from the rib at the inner end of the plane toward the rib at the outer end of said plane.

7. In an aerocraft, a fuselage and a plurality of planes positioned at the respective sides of said fuselage, each plane being of the bird wing type and embodying a series of longitudinally curved ribs positioned crosswise of the plane, said ribs decreasing in depth and length from the inner end of the plane toward the outer end thereof, the angle of incidence of the successive ribs decreasing from the rib at the inner end of the plane toward the rib at the outer end of said plane.

8. In an aerocraft, a plurality of bird wing planes extending outwardly from the body of the craft, each plane embodying longitudinal ribs curved lengthwise, and a series of ribs positioned crosswise of the plane, said crosswise ribs being tapered lengthwise and inclined downwardly toward the rear, combined with a third plane positioned over the inner portions of said first named planes, said third plane being curved lengthwise and crosswise and being provided with curved end portions, said third plane being of a length substantially less than the aggregate length of said first named planes.

9. In an aerocraft, a plane of the bird wing type embodying a plurality of longitudinal members each curved lengthwise and tapering in the direction of the length thereof, and a series of ribs positioned crosswise of the plane and united to said longitudinal members, said ribs being positioned at predetermined angles of incidence, the angle of incidence of the rib nearest the inner end of the plane being greater than the angle of the incidence of the ribs adjacent the outer end of the plane.

10. In an aerocraft, a plane comprising longitudinal members, ribs positioned crosswise of the plane and attached to said members, a covering for said ribs, shaft bearings positioned within the covering, each shaft bearing having a front member and a rear member fixed to said longitudinal members of the plane, and braces intermediate the rear and front members of the shaft bearings.

11. In an aircraft, a skeleton frame comprising non-breakable laminated ribs in spaced relation, each rib being composed of contacting layers of hard material and soft material, and a covering incasing said ribs and attached to the layers of soft material.

12. In an aircraft, a plane comprising a plurality of spaced ribs constituting a skeleton frame, each rib being laminated and composed of contacting layers of materials differing in compressive strength, and a covering attached to the rib layers of less compressive strength.

13. In an aircraft, a plane comprising a plurality of ribs producing a skeleton frame, each rib being composed of contacting layers of different materials mutually related to each other for securing maximum resistance to wind pressure, and a covering incasing the skeleton frame constituted by said ribs.

14. In an aircraft, a plane comprising a plurality of ribs assembled to produce a skeleton frame, each rib being laminated and composed of contacting layers of wood and metal, and a covering incasing the skeleton frame constituted by said ribs, said covering being attached to the wood layers of said ribs.

15. In an aircraft, a plane comprising composite ribs each consisting of layers of wood and metal assembled in contacting relation lengthwise of the rib and said layers mutually contributing to the compressive strength of the rib, and a cover attached to the wood layers of said composite ribs.

16. In an aircraft, a composite rib for a skeleton frame composed of layers of wood and metal assembled in contacting relation lengthwise of the rib and mutually contributing to the compressive strength of said rib, the layers composing said rib being bent and curved lengthwise.

In testimony whereof I have signed my name to this specification in the presence of two subscribing witnesses.

HARLOW T. STOKES.

Witnesses:
 ELBERT O. HULL,
 DANIEL J. RUSSELL.